Figure 1:
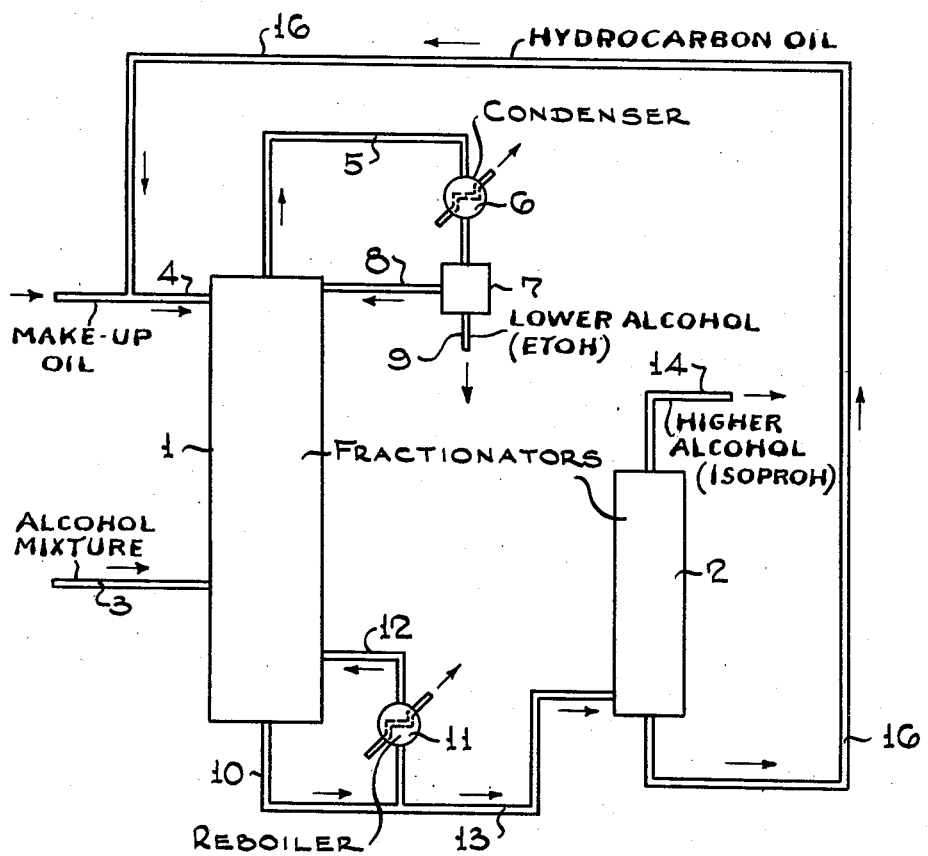

April 8, 1952

C. E. MORRELL ET AL 2,591,712

EXTRACTIVE DISTILLATION OF CLOSE-BOILING ORGANIC
COMPOUNDS FROM THEIR LIQUID MIXTURES

Filed Aug. 13, 1947

2 SHEETS—SHEET 1

Charles E. Morrell
Nat. C. Robertson
Inventors

By Henry Berk Attorney

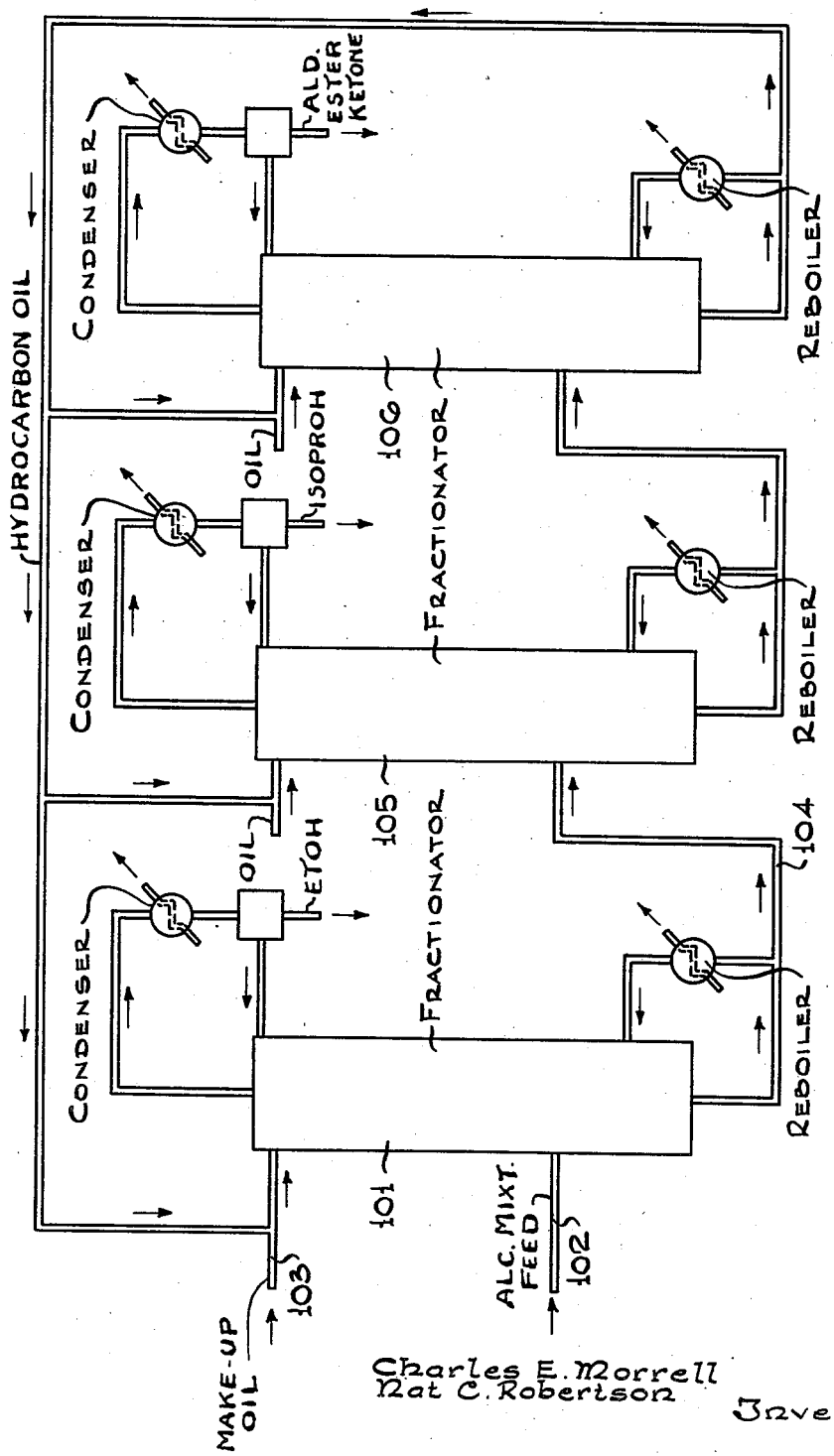

Patented Apr. 8, 1952

2,591,712

UNITED STATES PATENT OFFICE 2,591,712

EXTRACTIVE DISTILLATION OF CLOSE-BOILING ORGANIC COMPOUNDS FROM THEIR LIQUID MIXTURES

Charles E. Morrell, Westfield, N. J., and Nat C. Robertson, Corpus Christi, Tex., assignors to Standard Oil Development Company, a corporation of Delaware Application August 13, 1947, Serial No. 768,440

7 Claims. (Cl. 202—39.5)

This invention relates to a practical method of separating close-boiling oxygenated organic compounds and is concerned with the controlled use of a relatively high-boiling hydrocarbon liquid as a refluxing medium in a continuous fractional distillation of the close-boiling oxygenated compounds.

It has been suggested that a heavy oil be used as an absorbent to effect purification of aqueous alcohols prepared by the hydrolysis of alkyl sulfates. This purification has been effected by passing the vapors of the aqueous alcohol countercurrent to a stream of oil whereby the impurities are dissolved in the oil and removed. It has, however, not been possible to achieve separation by this method between several materials each of which is more volatile than the oil and which boil close together.

It is, therefore, an object of this invention to provide a commercially feasible process for the efficient separation of close-boiling oxygenated compounds which are difficult to separate by ordinary fractional distillation methods.

The process of this invention is best applied to distillation cuts or mixtures, the components of which distill within a narrow range, however, it may be applied to wide-boiling mixtures as well. The invention is particularly directed to the separation of alcohols of different types and molecular weights from one another and the separation of alcohols as a class or one particular alcohol from other oxygenated compounds such as ketones, acetals, esters, aldehydes, etc. Typical separations which can be made are ethyl from isopropyl alcohol, a mixture of ethyl and isopropyl alcohols from methyl ethyl ketone, ethyl from a mixture of isopropyl alcohol and methyl ethyl ketone, normal propyl from butyl and higher alcohols, a mixture of ethyl and isopropyl alcohols from other closely boiling oxygenated compounds, and ethyl alcohol from a mixture of isopropyl alcohol with other oxygenated compounds.

The crude oxygenated mixture may contain small amounts of water but in any case it must be miscible with the solvent in all portions of the fractionation zone.

Some of the above-described mixtures are obtained by an olefin hydration reaction, e. g., when a mixture of ethylene and propylene is absorbed in sulfuric acid, diluted, hydrolyzed, and a resulting aqueous alcohol mixture is stripped out. Another important source of such mixtures is the Fischer synthesis hydrogenation of carbon monoxide, especially when the aqueous layer product formed contains not only lower primary and secondary alcohols but also various ketones, aldehydes, ethers, acetals, esters, carboxylic acids and certain tertiary alcohols. Still another source is in the products of hydrocarbon oxidation where both oil and water layers are obtained, both containing oxygenated organic compounds. Narrow-boiling range mixtures which may be obtained by the ordinary distillation processes from aqueous solution are as follows:

TABLE I

*Narrow-boiling range alcohol mixtures*

| Group | Components | Normal B. Pt., °C. |
|---|---|---|
| I | Ethyl Alcohol | 78.5 |
|   | Isopropyl Alcohol | 82.3 |
| II | Ethyl Alcohol | 78.5 |
|    | Isopropyl Alcohol | 82.3 |
|    | Methyl Ethyl Ketone | 79.6 |
| III | Ethyl Alcohol | 78.5 |
|     | Isopropyl Alcohol | 82.3 |
|     | t-Butyl Alcohol | 83.0 |

The narrow-boiling range mixture may be a binary or tertiary mixture as in the groups shown, but generally the crude mixtures contain additional oxygenated organic compounds, which do not interfere with the basic operation of this invention in isolating the principal alcohol components of the mixtures.

A typical crude ethanol cut obtained from a water layer of a Fischer synthesis process contains the following:

TABLE II

*Ethanol cut*

| Compound 2 | Anhydrous B. Pt., °C. |
|---|---|
| Acetone | 56.5 |
| Methyl alcohol | 64.7 |
| n-butyraldehyde | 75.7 |
| Ethyl acetate | 77.1 |
| Ethyl alcohol | 78.5 |
| Methyl ethyl ketone | 79.6 |
| Isopropyl alcohol | 82.3 |
| t-butyl alcohol | 82.8 |
| Normal propanol | 97.2 |
| Methyl propyl ketone | 101.7 |
| Acetal | 103.2 |
| Water | 100.0 |

In such crude ethanol cuts, the kinds and relative quantities of the components vary greatly but the major components are generally ethyl alcohol, isopropyl alcohol and methylethyl ketone. Repeated fractional distillations of the ethanol cuts were found to be of no avail for effecting isolation of pure ethyl alcohol or pure isopropyl alcohol. The difficulties encountered can be appreciated by reference to Table II which shows the overlapping of the boiling points.

With the present invention it was found possible to effect the critical separations necessary in recovering the pure alcohols freed of the other substances normally boiling in the same narrow range, even though the contaminating substances have relatively lower and higher boiling points.

This is made possible by the discovery that when a mixture of oxygenated compounds, such as any of those mentioned above, are fractionally distilled in the presence of a sufficiently large volume per cent of a hydrocarbon which is liquid under the conditions existing in the fractionation zone, the normal volatilities of the oxygenated compounds are altered to such an extent that separations which are impossible by ordinary fractionation become possible in the presence of the hydrocarbon. In some cases a compound which is normally more volatile than some other compound is found to become less volatile than the other compound in the presence of a large quantity of a heavy hydrocarbon. For example, acetone is normally more volatile than ethyl alcohol, however, when these compounds are fractionated in the presence of sufficiently large quantities of a refined white oil, the ethyl alcohol is rendered more volatile and is taken off overhead while the acetone is removed as a dilute solution in the oil. On the other hand, other compounds which normally boil close together have their relative volatilities enhanced so that they may be easily separated. For example, ethyl and isopropyl alcohol boil close together and cannot be separated by conventional fractionation. However, by distilling these compounds in the presence of sufficiently large quantities of a white oil, the ethyl alcohol is rendered so much more volatile than the isopropyl alcohol that the ethyl alcohol is easily removed overhead and the isopropyl alcohol remains as a bottoms product with no detectable amount of ethyl alcohol present. In general, the alcohols as a class are rendered more volatile in the presence of the hydrocarbon liquid than any of the other oxygenated compounds.

The following tables list the relative volatilities of mixtures of various oxygenated organic compounds in the presence of a white oil.

The relative volatility is the volatility of one component divided by that of the other, the volatility of each component being proportional to its partial pressure divided by its mol fraction in the liquid phase. It is also defined by the equation Alpha$=(y_1/y_2)/(x_1/x_2)$ where $y$ refers to the vapor phase mol fractions of the components to be separated and $x$ refers to the liquid phase mol fractions of the components to be separated, subscript one designates the more volatile component and subscript two the less volatile component.

TABLE III

*Relative volatility of various mixtures in the presence of a white oil [1]*

| Components | | Charge | | Vapor Phase | | Liquid Phase | | Relative Volatility of A over B | |
|---|---|---|---|---|---|---|---|---|---|
| | | Mol Per cent | Vol. Per cent | Mol Per cent | Vol. Per cent | Mol Per cent | Vol. Per cent | With Oil | Without Oil |
| A. Ethanol | Binary Basis | 90 | | 90.5 | | 89.7 | | 1.09 | 0.37 |
| B. Acetone | | 10 | | 9.5 | | 10.28 | | | |
| White Oil | | | 90 | | 0.94 | | 93.7 | | |
| A. Ethanol | Binary Basis | 70 | | 71.75 | | 69.0 | | 1.14 | 0.37 |
| B. Acetone | | 30 | | 28.25 | | 31.0 | | | |
| White Oil | | | 90 | | 1.07 | | 94.0 | | |
| A. Ethanol | Binary Basis | 90 | | 94.69 | | 87.0 | | 2.66 | 1.03 |
| B. MEK | | 10 | | 5.31 | | 12.97 | | | |
| White Oil | | | 90 | | 0.8 | | 93.5 | | |
| A. Ethanol | Binary Basis | 70 | | 82.6 | | 61.3 | | 3.00 | 1.03 |
| B. MEK | | 30 | | 17.4 | | 38.7 | | | |
| White Oil | | | 90 | | 2.1 | | 93.6 | | |
| A. Isopropanol | Binary Basis | 90 | | 91.1 | | 88.5 | | 1.33 | 0.91 |
| B. MEK | | 10 | | 8.9 | | 11.5 | | | |
| White Oil | | | 90 | | 17.24 | | 95.3 | | |
| A. Isopropanol | Binary Basis | 70 | | 73.9 | | 64.7 | | 1.54 | 0.91 |
| B. MEK | | 30 | | 26.1 | | 35.3 | | | |
| White Oil | | | 90 | | 16.9 | | 95.4 | | |
| A. n-Propanol | Binary Basis | 90 | | 92.1 | | 86.8 | | 1.77 | 1.17 |
| B. MPK | | 10 | | 7.9 | | 13.2 | | | |
| White Oil | | | 90 | | 13.5 | | 95.7 | | |
| A. n-Propanol | Binary Basis | 70 | | 81.95 | | 49.9 | | 4.56 | 1.17 |
| B. MPK | | 30 | | 18.05 | | 50.1 | | | |
| White Oil | | | 90 | | 18.0 | | 95.7 | | |
| A. sec-Butanol | Binary Basis | 90 | | 91.25 | | 88.2 | | 1.40 | 1.10 |
| B. MPK | | 10 | | 8.75 | | 11.84 | | | |
| White Oil | | | 90 | | 18.0 | | 95.6 | | |
| A. sec-Butanol | Binary Basis | 70 | | 76.8 | | 61.5 | | 2.07 | 1.10 |
| B. MPK | | 30 | | 23.2 | | 38.5 | | | |
| White Oil | | | 90 | | 20.7 | | 94.2 | | |
| A. n-Butanol | Binary Basis | 70 | | 78.1 | | 63.6 | | 2.04 | 1.40 |
| B. n-Butyl Acetate | | 30 | | 21.9 | | 36.4 | | | |
| White Oil | | | 90 | | | | | | |
| A. n-Butanol | Binary Basis | 30 | | 40.0 | | 24.3 | | 2.08 | 1.40 |
| B. n-Butyl Acetate | | 70 | | 60.0 | | 75.7 | | | |
| White Oil | | | 90 | | | | | | |

[1] Highly treated kerosene fraction: B. P. 396°–522° F., Sp. Gr. 0.800, Aniline Pt. 176° F., Flash 160° F., Vis./100° F. 30 SSU.

TABLE IV

Relative volatility of various mixtures in the presence of a white oil [1]

| Components | | Charge | | Vapor Phase | Liquid Phase | | Relative Volatility A Over B | |
|---|---|---|---|---|---|---|---|---|
| | | Mol Per cent | Vol. Per cent | Mol Per cent | Mol Per cent | Vol. Per cent | With Oil | Without Oil |
| A. Ethanol | }Alcohol Basis | 50 | | 55.5 | 46.0 | | 1.46 | 1.15 |
| B. Isopropanol | | 50 | | 44.5 | 54.0 | | | |
| White Oil | weight per cent | | 80 | | | | | |
| A. Ethanol | }Alcohol Basis | 35 | | 40.8 | 30.4 | | 1.58 | 1.15 |
| B. Isopropanol | | 65 | | 59.2 | 69.6 | | | |
| White Oil | weight per cent | | 80 | | | | | |
| A. n-Propanol | }Alcohol Basis | 70 | | 72.3 | 63.7 | | 1.49 | 1.05 |
| B. sec-Butanol | | 30 | | 27.7 | 36.3 | | | |
| White Oil | weight per cent | | 90 | | | 97.1 | | |
| A. n-Propanol | }Alcohol Basis | 30 | | 34.5 | 27.0 | | 1.42 | 1.05 |
| B. sec-Butanol | | 70 | | 65.6 | 73.0 | | | |
| White Oil | weight per cent | | 90 | | | 93.7 | | |
| A. n-Butanol | }Alcohol Basis | 70 | | 72.2 | 63.6 | | 1.49 | 1.05 |
| B. sec-Pentanol | | 30 | | 27.8 | 36.4 | | | |
| White Oil | weight per cent | | 90 | | | 97.5 | | |
| A. n-Butanol | }Alcohol Basis | 50 | | 56.2 | 45.7 | | 1.52 | 1.05 |
| B. sec-Pentanol | | 50 | | 43.8 | 54.3 | | | |
| White Oil | weight per cent | | 90 | | | 93.8 | | |

[1] Highly treated coastal distillate: B. P. 732°–924° F., Sp. Gr. 0.885, Aniline Pt. 234° F., Flash 365° F., Vis./100° F. 350 SSU.

TABLE V

Relative volatility of n-propanol over sec-butanol in the presence of an alkylate bottoms fraction [1]

| Equilibrium mixture | Phase | Vol. Per cent Oil [1] | Mol Per cent n-PrOH | Mol Per cent sec-BuOH | Rel. Vol. n-PrOH to sec-BuOH | Equilibrium Temp., °C. |
|---|---|---|---|---|---|---|
| 1 | Charge | 90 | 90 | 10 | 1.46 | 120.2 |
| | Vapor | 33.6 | 91.9 | 8.12 | | |
| | Liquid | 94.0 | 88.6 | 11.42 | | |
| 2 | Charge | 90 | 70 | 30 | 1.39 | 120.2 |
| | Vapor | 33.6 | 73.85 | 26.15 | | |
| | Liquid | 94.0 | 67.1 | 32.9 | | |
| 3 | Charge | 90 | 50 | 50 | 1.40 | 120.2 |
| | Vapor | 33.6 | 56.1 | 43.9 | | |
| | Liquid | 92.5 | 47.7 | 52.3 | | |
| 4 | Charge | 90 | 30 | 70 | 1.55 | 117.8 |
| | Vapor | 33.6 | 37.0 | 63.0 | | |
| | Liquid | 92.4 | 27.5 | 72.5 | | |
| 5 | Charge | 90 | 10 | 90 | 1.43 | 119.2 |
| | Vapor | 33.6 | 12.7 | 87.3 | | |
| | Liquid | 93.0 | 9.26 | 90.7 | | |
| 6 | Charge | 90 | 90 | 10 | 1.46 | |
| | Vapor | 36.0 | 91.9 | 8.13 | | |
| | Liquid | 94.1 | 88.6 | 11.46 | | |
| 7 | Charge | 90 | 70 | 30 | 1.61 | 121.2/765 mm. |
| | Vapor | 37.4 | 76.0 | 24.0 | | |
| | Liquid | 94.1 | 66.3 | 33.7 | | |
| 8 | Charge | 90 | 50 | 50 | 1.75 | 118.0/769 mm. |
| | Vapor | 32.1 | 59.75 | 40.25 | | |
| | Liquid | 92.3 | 45.85 | 54.15 | | |
| 9 | Charge | 90 | 30 | 70 | 1.79 | 120.8/765 mm. |
| | Vapor | 33.0 | 39.7 | 60.3 | | |
| | Liquid | 92.3 | 26.9 | 73.1 | | |
| 10 | Charge | 90 | 10 | 90 | 1.57 | 122.6/756 mm. |
| | Vapor | 35.0 | 13.85 | 86.15 | | |
| | Liquid | 92.2 | 9.27 | 90.7 | | |
| 11 | Charge | 90 | 70 | 30 | 1.52 | 134.9/770 mm. |
| | Vapor | 49.2 | 75.6 | 24.4 | | |
| | Liquid | 92.8 | 67.1 | 32.9 | | |
| 12 | Charge | 90 | 50 | 50 | 1.38 | 129.4/763 mm. |
| | Vapor | 46.0 | 56.3 | 43.7 | | |
| | Liquid | 92.0 | 48.4 | 51.6 | | |
| 13 | Charge | 90 | 30 | 70 | 1.63 | 130.6/770 mm. |
| | Vapor | 46.0 | 38.9 | 61.1 | | |
| | Liquid | 92.0 | 28.1 | 71.9 | | |
| 14 | Charge | 90 | 10 | 90 | 1.58 | 133/768 mm. |
| | Vapor | 49.0 | 13.85 | 86.15 | | |
| | Liquid | 92.0 | 9.25 | 90.75 | | |

Alkylate bottoms fraction, B. P. 290°–398° F. by 10% gas-oil distillation.

The data in the above tables indicate quite clearly that the large proportion of hydrocarbon liquid present in the liquid phase as a refluxing medium with the mixed compounds increases the relative volatility and in all but two cases increases the normal volatility ratio, the ratio being reversed for acetone-ethyl alcohol and isopropyl alcohol-methyl ethyl ketone.

To obtain the desired separation of purified organic components from mixtures like those mentioned with benefits of the present invention, the mixture is subjected to a continuous fractional distillation in a column of practical size, including a rectification zone and a stripping zone for countercurrent vapor-liquid contact under reboiling and refluxing conditions. A sufficiently large quantity of hydrocarbon liquid is introduced at an upper part of a rectification zone to effectively modify the relative volatilities of the organic compounds to be separated and to distill a larger part of one component or group of components than of another component or another group of components from the internal reflux.

The separation can be effected in a continuous manner under steady state conditions to obtain product streams of desired purities and constant compositions while supplying the large quantity of hydrocarbon liquid to the upper part of the rectification zone. The temperature of the hydrocarbon introduced into the rectification zone is preferably close to the temperature of liquid on its feed plate, although it may be lowered to partially condense vapors ascending to the solvent feed plate.

Since the efficient operation is essentially continuous, the hydrocarbon has to be added continuously near the top of a fractionating column while the mixture of oxygenated organic compounds to be separated is fed continuously into the column at a lower point while sufficient heat is provided to afford distillation throughout the column.

The feed stream of the oxygenated organic compounds is preferably introduced into a fractionating column between an upper rectification section and a lower stripping section at a point where the ratio of the main organic compounds to be separated in the feed is similar to the ratio of these compounds in the internal reflux descending through the column.

The feed stream is preferably preheated to a temperature close to that of the internal liquid reflux under practically equilibrium boiling conditions at the point of introduction. The preheated feed stream may be liquid, partially vaporized, or completely vaporized when introduced into the fractionating column.

Vapors of the organic compounds introduced as a feed stream at the bottom part of a rectification zone in a fractionating column pass up through the rectification zone in contact with descending internal liquid reflux under practically equilibrium reboiling and refluxing conditions.

The quantity of solvent required to be introduced continuously at the upper part of the rectification zone for accomplishing the desired separation of the close-boiling compounds is considerably greater than the quantity of condensate with which it becomes homogeneously mixed. This is necessary in order to make the hydrocarbon concentration of the internal reflux substantially above a critical minimum in the range of 70-90 volume per cent. With adequate hydrocarbon concentration in the internal reflux for effecting the separation, the organic component to be isolated in the bottoms is dissolved in the internal reflux that reaches the bottom part of the rectification zone and finally the bottom of the stripping zone.

The minimum hydrocarbon concentration in the internal reflux for obtaining the separation depends on the particular organic compounds to be separated and varies between 70 and 99 volume per cent. In a limiting case of isolating ethyl alcohol from isopropyl alcohol, essentially no separation is effected if the internal reflux contains less than 80 volume per cent hydrocarbon, and for obtaining satisfactory results on a practical scale, more than 90 volume per cent hydrocarbon, preferably 90-99 volume per cent solvent, is required in the internal liquid reflux. As the hydrocarbon dilution of the internal reflux becomes infinite, the selectivity of separation is increased but the operating efficiency is excessively lowered on account of the relatively small quantities of the oxygenated organic compounds being processed.

Under steady state conditions existing in a continuously operating fractional distillation zone, the internal reflux having adequate concentration for accomplishing the separation of the close-boiling alcohols and other oxygenated compounds, there tends to be a nearly constant hydrocarbon concentration in the homogeneous liquid phase on each plate above the feed point and on each plate below the feed point although the average concentration on the plates above and below the feed point may differ. This internal reflux in flowing from the top to the bottom becomes richer in the oxygen compounds having the lowest relative volatility in the presence of the hydrocarbon while the oxygen compounds having the highest relative volatility in the hydrocarbon are distilled overhead.

The overhead vapors from the rectification zone are enriched in one or more of the organic components rendered relatively more volatile by the high hydrocarbon concentration in the liquid reflux while the remaining portion of the organic material introduced with the feed remains dissolved in the internal reflux.

The functioning of the stripping zone may be described as follows:

The anhydrous mixture of the close-boiling alcohols and other oxygenated compounds to be separated, as in the liquid reflux from the bottom of the rectification zone, flows downwardly through the stripping zone in countercurrent contact with ascending vapors evolved from the solution under reboiling conditions. A sufficiently high concentration of hydrocarbon is maintained in the liquid flowing down through the stripping zone, as in the rectification zone, to make the liquid progressively richer in oxygenated compounds having the lowest relative volatility in the hydrocarbon while the oxygenated compounds having the highest relative volatility in the hydrocarbon are stripped from the liquid. Under practically equilibrium reboiling and refluxing conditions for complete stripping in the stripping zone, the organic compounds rendered more volatile may be removed as vapor overhead from the stripping zone at the same rate that they enter the stripping zone as part of the liquid feed to this zone and a solution of the organic compounds rendered less volatile freed of the more volatile compounds in the liquid may be withdrawn from a bottom part of the stripping zone.

Suitable hydrocarbon liquids for use in this process include refined white oils, pure paraffins, olefins, naphthenes, aromatics and mixtures of these. Fractions from virgin or cracked stocks may also be used. The initial boiling point of the hydrocarbons used should not be appreciably lower than that of the highest boiling oxygenated component to be separated. The final boiling point of the hydrocarbon is not material except that the hydrocarbon must be liquid under the conditions in the tower. However, in order to prevent the formation of azeotropes which present operational difficulties, it is preferred to use hydrocarbons which boil about 100° C. but at least 70° C. higher than the highest boiling component to be separated.

In the accomplishment of the foregoing and related ends, the invention then comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed.

Figure 1 of the drawing illustrates a flow plan of a unit for obtaining separation between two products, such as for example, between ethyl and isopropyl alcohol in mixtures containing the same.

Figure 2 illustrates a flow plan on an expanded unit for accomplishing further separations of the products.

Referring to Figure 1, 1 represents a fractional distillation column in the interior of which is provided means for obtaining efficient countercurrent liquid-vapor phase contacting, e. g., such conventional means as bubble plates or packing and 2 represents a tower for recovering hydrocarbon from the bottoms of tower 1.

This invention will be described in detail as applied to the separation of isopropyl alcohol from a typical ethanol cut obtained from the water layer of a Fischer synthesis process. A fraction of this type from which most of the water has been removed, for example, by azeotrope distillation has the following composition:

| Compounds | Anhydrous B. P., ° C. | Weight, Per Cent |
| --- | --- | --- |
| Acetone | 56.5 | Trace. |
| Methyl alcohol | 64.7 | Do. |
| n-butyraldehyde | 75.7 | 1.8. |
| Ethyl acetate | 77.1 | 2.2. |
| Ethyl alcohol | 78.5 | 85.0. |
| Methyl ethyl ketone | 79.6 | 4.3. |
| Isopropyl alcohol | 82.3 | 2.5. |
| n-propyl alcohol | 97.2 | Trace. |
| Hydrocarbon |  | 1.7. |
| Unknown |  | 2.5. |

After removal of the water, this fraction can then be distilled to effect a separation from all material boiling above 100° C. i. e., methyl propyl ketone and acetal. The overhead fraction, consisting of products boiling between 75° and 83° C. is suitable as a feed stock for this invention.

Referring to the drawing, this fraction is introduced by line 3 into the tower 1 where it is fractionated in the presence of a liquid stream of a white oil having a boiling point of 396–522° F. (200°–265° C.) introduced through line 4. The conditions in the tower are such as to cause a distillation of the oxygenated compounds in the presence of the oil on each plate of the tower. A sufficient amount of oil is added so that it is present to the extent of 90 volume per cent on each plate. As the vapors of the feed pass up the column some of them are dissolved in the large excess of oil descending the column and are collected together with the oil in pools on each plate. Conditions are maintained on each plate of the tower such that the liquid mixtures of the close-boiling oxygenated compounds are at their boiling points and are continuously being contacted with vapors boiled from the plates below. Because of the enhanced volatility of the ethyl alcohol in relation to the isopropyl alcohol and other components the vapors are relatively rich in the former and poor in the latter. By maintaining the amount of oil on each plate so large that infinite dilution is approached, the optimum relative volatilities for the separation of the desired components can be secured. Furthermore, by controlling the amount of oxygenated compound reflux and consequently the reflux ratio and the number of plates, the actual degree of separation may be varied until the desired product purity and recovery are obtained. Thus a suitable temperature and reflux conditions are maintained in the tower so that ethyl alcohol appears in the overhead stream and isopropyl alcohol, butyraldehyde, ethyl acetate and methyl ethyl ketone in the bottoms product.

Overhead vapors consisting substantially of pure ethanol are withdrawn from the top of column 1 through line 5 by which they are passed through condenser 6 to a receiver 7. A portion of the condensate collected in receiver 7 is returned to the top part of the column 1 as external reflux through line 8. The remaining portion of distillate collected in receiver 7 is withdrawn through line 9 as a product.

Bottoms liquid consisting of a solution of isopropyl alcohol, butyraldehyde, ethyl acetate and methyl ethyl ketone in oil collected at the lower part of column 1 is passed by line 10 into reboiler 11 for heating by indirect or direct heat exchange with a heating medium such as live steam. A portion of the bottoms liquid heated and partially vaporized in the reboiler 11 is recycled by line 12 to the lower part of column 1. The remaining portion is withdrawn through line 13 to tower 2 where the isopropyl alcohol, butyraldehyde, ethyl acetate and methyl ethyl ketone are separated from the oil and removed overhead through line 14. Oil is removed from the bottom of the tower through line 15 and recycled to tower 1 through line 16.

In Figure 2 is shown a diagrammatical flow plan of a modified process for obtaining separate ethyl alcohol and isopropyl alcohol products in substantial purity from an ethanol cut subjected to a multi-stage distillation in the presence of large quantities of oil.

Referring therefore to this drawing, vapors of an ethanol cut having a composition of the type disclosed above in connection with Figure 1 are introduced through line 102 into column 101 and passed countercurrent to a white oil boiling from 396°–522° F. introduced through line 103. Conditions are maintained on each plate such that the oil is present in greater than 90% by volume. Ethyl alcohol is taken off overhead and other constituents including butyraldehyde, ethyl acetate, methyl ethyl ketone and isopropyl alcohol are taken off in the bottoms as a dilute solution in the oil.

The bottoms fraction is then passed by line 104 to a second distillation tower 105 where it is subjected to another distillation in the presence of greater than 90 volume per cent of the same oil used in tower 101. In this tower conditions are maintained so that isopropyl alcohol is taken off overhead and butyraldehyde, ethyl acetate and methyl ethyl ketone are removed from the bottom in a dilute oil solution. The bottoms thus obtained is distilled in tower 106 whereby butyraldehyde and ethyl acetate and methyl ethyl ketone are taken off overhead and oil drawn off the bottoms for recycle through line 107.

The nature and objects of the present invention having been thus fully set forth and specific examples of the same given, what is claimed as new and useful and desired to be secured by Letters Patent is:

1. In a process of separating anhydrous alcohols which form close-boiling mixtures difficult to separate by ordinary fractional distillation, the steps which comprise continuously passing into an upper part of a stripping zone a solution of the alcohols in a white oil boiling at least 70° C. above the highest boiling alcohol so that a liquid portion of said solution flows downwardly through the stripping zone in countercurrent contact with vapors evolved from the solution under constant refluxing and reboiling conditions maintaining a sufficiently high concentration of solvent in the resulting internal reflux to effect vaporization of a larger part of one of said alcohols than of another of said alcohols having a higher molecular weight, the alcohols thus rendered more volatile being withdrawn overhead as vapor at essentially the same rate that this alcohol dissolved in the solvent enters the stripping zone and withdrawing from a bottom part of the stripping zone a solution of said alcohol in hydrocarbon solvent having a higher molecular weight substantially free of the alcohol rendered more volatile.

2. The method of separating substantially anhydrous alcohols of higher and lower molecular weight which form close-boiling mixtures difficult to separate by ordinary fractional distillation and which boil in the boiling range of methanol through pentanol, which comprises continuously introducing a feed mixture of said alcohols to a fractionation zone wherein vapors of said alcohols ascend countercurrently to a liquid reflux of the alcohols dissolved in 70 to 99 volume per cent of a liquid hydrocarbon solvent which boils at a temperature sufficiently above the boiling points of the alcohols so that it does not azeotropically distill with any of said alcohols, from the fractionation zone, to effect a higher vaporization of the lower molecular weight alcohol than of the higher molecular weight alcohol, continuously removing fractionated vapors of the lower molecular weight alcohol overhead from the fractionation zone, and removing a solution of the higher molecular weight alcohol in the hydrocarbon solvent from a bottom portion of the fractionation zone.

3. The method of separating a substantially anhydrous mixture of ethyl alcohol and isopropyl alcohol which comprises continuously introducing the mixture into a fractionation zone wherein vapors of said alcohols ascend countercurrently to a liquid reflux of the alcohols dissolved in 80 to 99 volume per cent of a liquid hydrocarbon solvent which boils at least 70° C. higher than the isopropyl alcohol to effect a higher vaporization of ethyl alcohol than of isopropyl alcohol, continuously removing fractionated vapors of ethyl alcohol overhead from the fractionation zone, and removing a solution of isopropyl alcohol in the hydrocarbon solvent from a bottom portion of the fractionation zone.

4. A process for separating n-butanol from secondary pentanol, which comprises introducing a mixture of said alcohols into a fractional distillation zone wherein vapors of said alcohols ascend countercurrently to a liquid reflux of the alcohols dissolved in 85-99 volume percent of a liquid hydrocarbon which boils at least 70° C. higher than the boiling point of said alcohols to effect a higher vaporization of the n-butanol than of the secondary pentanol without azeotropically distilling with the n-butanol, continuously removing fractionated vapors of n-butanol overhead from the fractional distillation zone, and removing a solution of the secondary pentanol in the hydrocarbon from a bottom part of the fractional distillation zone.

5. The method of separating tertiary butyl alcohol from a $C_2$–$C_3$ alcohol close boiling thereto, which comprises extractively distilling in a fractional distillation zone a mixture of said alcohols dissolved in a major volume proportion of hydrocarbon solvent that boils sufficiently above the boiling points of said alcohols so as not to azeotrope with any of said alcohols, and recovering as a distillation residue a solution of the tertiary butyl alcohol in the hydrocarbon solvent free of the $C_2$–$C_3$ alcohol, which is distilled therefrom in said zone.

6. A process of separating a mixture of two or more saturated unsubstituted aliphatic alcohols containing not more than four carbon atoms and having closely related boiling points which comprises extractively distilling the mixture in the presence of a solvent selected from the group consisting of aromatic hydrocarbons, paraffinic hydrocarbons, and naphthenic hydrocarbons, which solvent has a boiling point sufficiently above that of the highest boiling alcohol in the mixture that it does not form an azeotrope therewith.

7. The process described in claim 6, wherein the mixture contains normal propanol and secondary butanol as the alcohols to be separated.

CHARLES E. MORRELL.
NAT C. ROBERTSON.

REFERENCES CITED

The following references are of record in the file of this patent:

UNITED STATES PATENTS

| Number | Name | Date |
|---|---|---|
| 2,107,265 | Archibald | Feb. 8, 1938 |
| 2,339,160 | Dunn et al. | Jan. 11, 1944 |
| 2,483,246 | Stribley | Sept. 27, 1949 |
| 2,500,596 | Adelson | Mar. 14, 1950 |

OTHER REFERENCES

Mair et al., Bureau of Standards, Journal of Research, vol. 27, pages 39–63.